United States Patent [19]

Steiger

[11] 3,927,776
[45] Dec. 23, 1975

[54] SAFETY LOCK DEVICE FOR THE CONTROL LEVERS OF A FRONT END LOADER

[76] Inventor: Douglas W. Steiger, Box N, Thief River Falls, Minn. 56701

[22] Filed: Mar. 4, 1974

[21] Appl. No.: 447,943

[52] U.S. Cl. ................. 214/140; 180/101; 214/762
[51] Int. Cl.² ............................................ E02F 3/34
[58] Field of Search ............ 214/140, 762; 180/100, 180/101

[56] References Cited
UNITED STATES PATENTS

| 653,879 | 7/1900 | Phelps | 180/101 |
|---|---|---|---|
| 1,168,248 | 1/1916 | Bolley | 180/101 |
| 1,409,202 | 3/1922 | Sabattier | 180/101 |
| 3,614,273 | 10/1971 | Wallace | 214/762 |
| 3,700,062 | 10/1972 | Garnett | 180/101 |

FOREIGN PATENTS OR APPLICATIONS

| 460,126 | 11/1913 | France | 180/101 |

Primary Examiner—Robert J. Spar
Assistant Examiner—Ross Weaver

[57] ABSTRACT

A front end loader includes a pair of generally vertically disposed control levers, each being pivotal about its vertical longitudinal axis, and each being pivotal in a fore and aft direction. Movement of the control levers controls operation and steering of the vehicle, and also controls operation of the loader lift arms and implement. An operator's seat, located rearwardly of the control levers, is pivotally mounted on the loader body for pivotal movement between a raised position, and a lowered position in response to a person sitting on the seat. A locking device is interconnected with the seat and releasably locks the control levers against movement. Yieldable means normally urges the locking device into locking relation with the control levers and also urges the seat to a raised inoperative position.

7 Claims, 4 Drawing Figures

SAFETY LOCK DEVICE FOR THE CONTROL LEVERS OF A FRONT END LOADER

SUMMARY OF THE INVENTION

This invention relates to a safety locking system for releasably locking the control levers of a front end loader.

In certain loader vehicles, operation and steering of the vehicle, and operation of the lift arms and implement are controlled by manipulation of a pair of control levers which are located forwardly of the operator's seat. Although front end loader vehicles of this type are essentially safe with respect to accidental operation of an unattended vehicle by a child, there is always the chance occurrence of this type of accident.

It is therefore a general object of this invention to provide a front end loader vehicle with a safety lock system operable to releasably lock the control levers of the loaders against movement when the operator seat is unoccupied or is occupied by a small child.

More specifically, the safety lock system of the present invention includes a locking linkage which is interconnected with the vehicle seat and releasably engagable with the control lever to normally but releasably lock the control levers against movement when the seat is in a raised inoperative position. Yieldable means urge the locking linkage into locked relation with the control levers, and also urge the pivotal operator's seat towards a raised inoperative position. With this arrangement, the locking linkage is shifted to the released condition when the seat is shifted downwardly in response to a person sitting thereon. Thus the control linkage will remain in a locked condition when the seat is unoccupied or when the seat is occupied by a relatively small child whose weight is insufficient to urge the seat downwardly to a lowered position.

FIGURES OF THE DRAWINGS

DETAILED DESCRIPTION OF THE PREFERRED EMBODIMENTS

Figure 1:
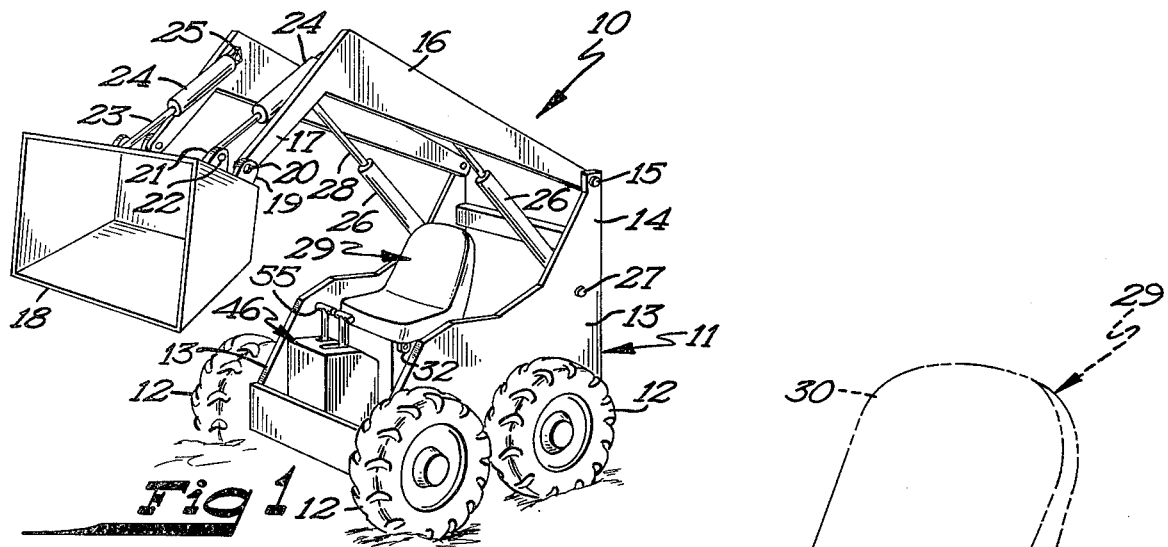
FIG. 1 is a perspective view of the front end loader utilizing the novel locking system.

Referring now to the drawings, it will be seen that one embodiment of the small front end loader vehicle, designated generally by the reference numeral 10 is there shown. This type of front end loader vehicle, which is steered by driving the wheels of one side of the vehicle only, or steered by driving the wheels of one side of the vehicle in one direction and by driving the wheels of the other side of the vehicle in the opposite direction, is generally known in the art as a skid steer loader vehicle. The skid steer loader vehicle includes a body 11 having pairs of ground engaging wheels 12 located on opposite sides thereof. The body 11 is comprised of side plates 13 each including an upstanding portion 14 adjacent the rear end thereof.

The loader vehicle 10 also is provided with a pair of elongate lift arms, 16 each which are pivotally connected at one end thereof to one of the upstanding portions 14 by a pivot 15. Thus the lift arms 16 are vertically swingable about a horizontal transverse axis between lowered and raised positions. Each of the arms 16 also includes a downwardly projecting forward position 17 which projects forwardly of the front end of the vehicle body 11. A scoop 18 provided with a pair of laterally spaced apart ears 19, and these ears are pivotally connected to the front end of the arms 16 by pivots 20. It will therefore be seen that the scoop 18 is vertically swingable relative to the arms about a substantially horizontal transverse axis. It is pointed out that the front end loader, having been provided with implements other than the scoop 30, such implements including lift fork, scraper blades and the like.

In the embodiments shown, means are provided for power shifting the scoop 18 about its pivotal axis, and to this end, the scoop is provided with a pair of ears 21 affixed thereto and projecting therefrom. Each of the ears 21 is pivotally connected by a pivot 22 to the outer end of the piston rod 23 of a piston and cylinder unit 24. Each of the piston and cylinder units 24 is pivotally connected by a pivot 25 to the lift arms 16 intermediate the ends thereof.

Means are also provided for raising and lowering the lift arms 16 and this means includes a pair of piston and cylinder units 26 which are pivotally connected to the side plates 13 by pivots 27. The piston rod 28 of each piston and cylinder unit 26 is also pivoted to the lift arm 16 by pivots (not shown). It is pointed out that the piston and cylinder units 24 and 26 are hydraulic double-acting type. It will therefore be seen that when the piston and cylinder unit 26 are extended and retracted, the arms 16 will be raised and lowered, and when the piston and cylinder units 24 are extended and retracted, the scoop 18 will be pivoted about its pivotal axis.

The loader vehicle 10 is provided with a seat 29 which includes a generally vertically disposed back rest portion 30 and a generally horizontally disposed seat portion 31. The seat portion 31 is provided with a pair of laterally spaced apart, downwardly projecting ears 32 located adjacent the front end thereof and depending from opposite sides thereof. These downwardly projecting ears are connected by pivots 33 to a generally rectangular shaped, vertically disposed seat base 34 which is affixed to the floor of the body 11. The base 34 is comprised of a front wall 35, a rear wall 36, opposed side walls 37 and a bottom wall 38. It will therefore be seen that the seat 29 is vertically shiftable adjacent its front end about a substantially horizontal axis defined by the pivots 33.

The lower surface of the seat portion 31 is also provided with a pair of ears 39 which are affixed thereto and which depend therefrom. It will be noted that the ears 39 are disposed in closely spaced apart relation and are located adjacent the rear of the seat portion 31, and are connected by a pivot 40 to one end of an elongate lever 41. A pair of vertical posts 42 are fixedly connected to the bottom wall of the seat base 34 and project upwardly therefrom. The posts 42 are disposed in side-by-side relation and the lever 41 is positioned therebetween and is pivotally connected thereto by pivot 43. Thus the lever 41 is vertically swingable about a horizontal axis defined by the pivot 43. It will be noted that the lever 41 is of angular construction and includes an arm portion 44 which is that part of the lever connected to the seat portion 31. The lever projects through an opening 35a in the front wall 35 of the seat base 34 and is provided with a pair of longitudinally spaced apart, vertically extending keeper elements 45 at its front end.

The tractor body 11 is provided with a control housing 46 comprised of a substantially flat vertical front wall 47, a rear wall 48, substantially opposed parallel side walls 49, a generally rearwardly inclined top wall 50 and a substantially flat bottom wall or plate 51. The top wall 50 is provided with a pair of laterally spaced apart elongate longitudinally extending slots 52 therein.

The control housing 46 accommodates a pair of generally vertically disposed elongate operating levers 53, each being connected adjacent its lower end to a coupling 54. Each operating lever 53 is also provided with a transverse hand grip portion 55 at its upper end to facilitate movement of the lever during manipulation thereof. In this respect, it is pointed out that each coupling connection 54 mounts each lever on the body 11 of the vehicle so as to permit fore and aft pivotal movement of each lever about a transverse axis, and also permitting revolving movement of each lever about its longitudinal vertical axis.

Each operating lever 53 has a substantially flat generally rectangular shaped plate 56 fixedly mounted thereon, intermediate the ends thereof. A pair of actuating links 57 are pivotally connected adjacent their respective downturned front ends 58 to each plate 56, each plate having a pair of openings 56a therein to accommodate the downturned ends 58 of the actuating links. The actuating links 57 for one of the control levers are connected to and control operation of a hydraulic valve assembly (not shown) which in turn controls operation of the hydraulic piston and cylinder units 24 and 26. Each of the actuating links 57 for the other control lever is connected to and controls operation of one of a pair of hydrostatic drive units (not shown) for controlling operation of the wheels of the loader vehicle. Details of construction of this drive and control system is set forth in detail in my copending application, Ser. No. 214,659 filed Jan. 3, 1972 and entitled "Improved Front End Loader Vehicle," and the entire disclosure of this copending application is incorporated by reference with respect to the instant application.

Referring again to FIGS. 3 and 4, it will be seen that the front wall 47 of the control housing 46 is provided with an apertured ear 59 which is affixed to the inner surface thereof and which projects rearwardly therefrom. A generally U-shaped locking member 60 is pivotally connected to the ear 59 by a pivot 61 which permits vertical swinging movement of the U-shaped locking member 60 about a transverse axis. The U-shaped locking member 60 includes a pair of elongate legs 62 which are disposed in spaced apart substantially parallel relation and which are interconnected at one end thereof by a bight portion 63.

The lower edge of each of the legs 62 of the locking member 60 has an arcuate lock engaging recess 64 formed therein intermediate the ends thereof, the locking recess in one leg being disposed in lateral alignment with the locking recess in the other leg. A pin 65 extends between and is rigidly connected to the legs 62, and it will be noted that the pin is disposed between the bight portion 63 and the locking recesses 64. A coil spring 66 has one end thereof connected to the pin 65 and has its other end anchored to a suitable rod or pin 65 secured to the walls of the control housing adjacent but spaced above the bottom plate 51 thereof. This coil spring tends to urge the locking member 62 in a downward direction.

Figure 2:
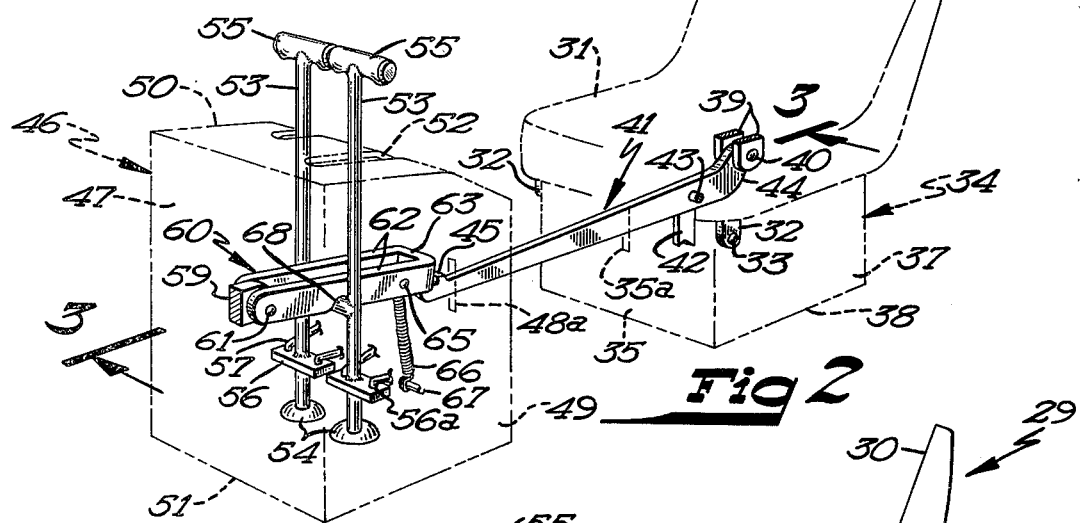
FIG. 2 is a diagrammatic perspective view of the control lever locking system, with certain parts thereof illustrated by dotted line configuration.
Figure 3:
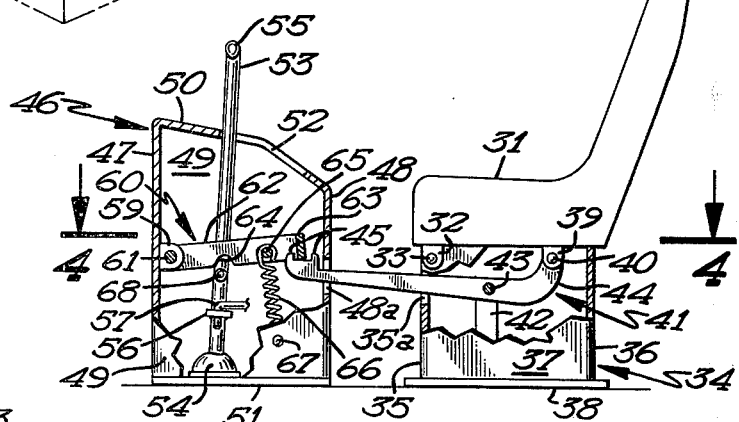
FIG. 3 is a cross-sectional view, taken approximately along lines 3—3 of FIG. 2 and looking in the direction of the arrows.
Figure 4:
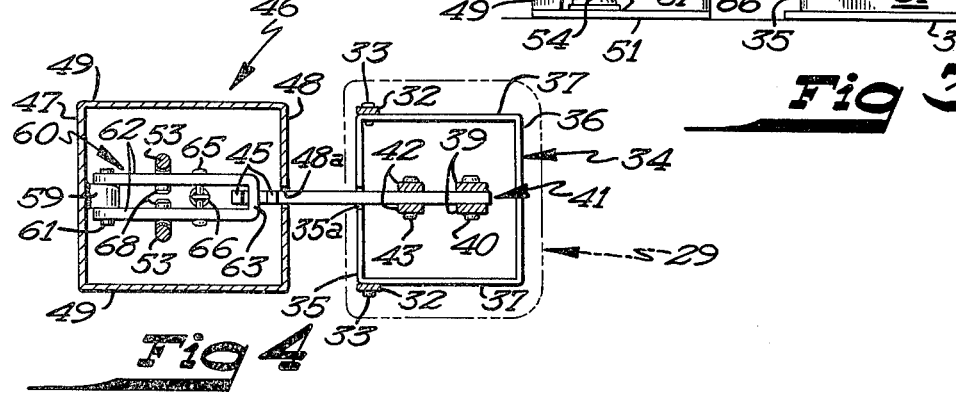
FIG. 4 is a cross-sectional view taken approximately along lines 4—4 of FIG. 3 and looking in the direction of the arrows.

Each of the control levers 53 has a transversely extending locking pin 68 secured thereto and projecting inwardly therefrom, as best seen in FIGS. 2 through 4. It will be noted that the locking pins 68 are disposed in alignment with respect to each other, and each is positioned below the locking member 62. It will therefore be seen that the coil spring 66 urges the locking member 62 downwardly and will cause the locking recesses 64 to engage the locking pins 68 on the control levers 53, when the control levers are in a neutral upright position.

It will also be noted that the bight portion 63 of the locking member 62 engages the flat upper surface located at the front end of lever 41 between the keeper elements 45 thereof. In this respect, it will be noted that the lever 41 projects through an opening 48a in the rear wall 48 of the housing 46. Thus the coil spring 66 acting through the locking member 62 and the lever 41 and also urges the seat 29 in an upward direction to the inoperative raised position. Therefore, when the seat 29 is unoccupied and the control levers 53 are in the neutral positions, the control levers will be locked by the locking member 62 against movement and the seat will be tilted vertically to the raised inoperative position. The lever 41 and the locking member 62 actually constitutes a locking linkage which is normally urged to the lever-locked position.

The locking member will be shifted to the unlocked position when a person sits upon the seat portion 41 thereby tilting or urging the rear portion of the seat downwardly and raising the front end portion of the lower 41. When the front end portion of the lever 41 is raised, the locking member 62 is moved upwardly so that the locking recesses 64 are disengaged from the locking pins 68 on the control levers 53 thereby releasing the control levers for operation. It should be pointed out that the downward force needed to move the seat downwardly so as to disengage the locking member 62 from the control levers 53 must be sufficient to overcome the resistance offered by the helical coil spring 66. For example, a load of at least 100 pounds applied to the seat will be required in order to overcome the resistance produced by the spring 66. It is further pointed out that that the load necessary to overcome the resistance of the spring 66 may be varied by selecting springs of various strength.

From the foregoing description, it will be seen that I have provided a novel safety locking device which minimizes, if not precludes the inadvertent operation of a front end loader vehicle by a small child. My novel safety locking system is self-operating and is highly effective in releasably locking the control levers of the vehicle against any movement, the operator's seat is unoccupied.

Thus it will be seen that I have provided a novel safety lock system for the control of a front end loader, which system is not only of simple and inexpensive construction, but one which functions in a more efficient manner than any heretofore known comparable locking system.

What is claimed is:

1. A front-end loader vehicle, including a body having ground engaging wheels, power means for driving the wheels, elongate arms pivotally mounted on the body for a vertical swinging movement relative thereto, implement pivotally mounted on the arms for vertical swinging movement relative thereto, a seat pivotally connected adjacent its front end to the body for vertical swinging movement between a raised inoperative position and a lowered operative position in response to a person sitting on said seat, a pair of generally vertically disposed control levers positioned in side-by-side relation forwardly of said seat and each being pivotal in a fore and aft direction, and also pivotal about its vertical longitudinal axis, to control operation and steering of the vehicle and operation of the arms and implement, lock engaging means on said levers,
 a locking member pivotally connected with said body and being spaced forwardly of said seat for movement relative to said body between locking and released positions, said locking member when in the locking position engaging said locking engaging means to lock the levers against movement, and when in the released position, releasing said levers for movement,
 yieldable means engaging said locking member to yieldably urge the locking means towards the locked position and urging the seat to the raised inoperative position, an elongate actuating lever pivotally mounted on said body intermediate its ends and being connected with said seat and projecting forwardly therefrom, said actuating lever engaging said locking member and shifting the same to the released position when the seat is shifted to the lowered position in response to a person sitting on the seat.

2. The vehicle as defined in claim 1 wherein said locking engaging means comprise locking engaging pins on the control levers, and wherein said locking member has a plurality of locking recesses therein, each receiving one of said lock engaging pins therein when the locking means is in the locking position.

3. The vehicle as defined in claim 1 wherein said locking member is of elongate construction and extends in a forward and rearward direction, said locking member being pivotally connected adjacent its forward end to said body and being engaged adjacent its rear end by said actuating lever.

4. The vehicle as defined in claim 3 wherein said locking member is of U-shaped construction.

5. The vehicle as defined in claim 1 wherein said actuating lever is pivotally connected adjacent its rear end to seat adjacent the rear portion of the latter.

6. The vehicle as defined in claim 1 wherein said actuating lever has a pair of vertically disposed keeper elements thereon adjacent its forward end to facilitate engagement of the actuating lever with said locking member.

7. The vehicle as defined in claim 1 wherein said locking member is of elongate construction and extends in a forward and rearward direction, said locking member being pivotally connected with said body adjacent its forward end for vertical swinging movement between released and locked positions, said lock engaging means comprising a pair of locks engaging pins, each affixed to one of said control levers, recesses in said locking member for receiving the locking pins therein when the locking member is in the locking condition, said actuating lever being pivotally connected adjacent its rear end to said seat adjacent the rear of the latter, the forward end portion of said actuating lever engaging the rear end portion of said locking member to shift the same vertically to the released portion when the seat is lowered in response to a person sitting thereon.

* * * * *